United States Patent
Kato et al.

(10) Patent No.: US 11,054,833 B2
(45) Date of Patent: Jul. 6, 2021

(54) VEHICLE CONTROL DEVICE

(71) Applicant: HONDA MOTOR CO., LTD., Tokyo (JP)

(72) Inventors: Daichi Kato, Wako (JP); Hiroshi Oguro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 16/342,813

(22) PCT Filed: Oct. 18, 2016

(86) PCT No.: PCT/JP2016/080785
§ 371 (c)(1),
(2) Date: Apr. 17, 2019

(87) PCT Pub. No.: WO2018/073887
PCT Pub. Date: Apr. 26, 2018

(65) Prior Publication Data
US 2020/0057447 A1     Feb. 20, 2020

(51) Int. Cl.
*G05D 1/02*     (2020.01)
*B60W 30/095*   (2012.01)
*B60W 40/02*    (2006.01)

(52) U.S. Cl.
CPC ....... *G05D 1/0219* (2013.01); *B60W 30/0956* (2013.01); *B60W 40/02* (2013.01)

(58) Field of Classification Search
CPC . G05D 1/0219; B60W 40/02; B60W 30/0956
See application file for complete search history.

(56) References Cited

U.S. PATENT DOCUMENTS

| | | | |
|---|---|---|---|
| 6,526,352 B1* | 2/2003 | Breed | G01S 13/931 |
| | | | 701/470 |
| 2004/0193349 A1* | 9/2004 | Flann | A01B 69/008 |
| | | | 701/50 |
| 2008/0046150 A1* | 2/2008 | Breed | B60R 21/0134 |
| | | | 701/45 |
| 2013/0110343 A1 | 5/2013 | Ichikawa et al. | |
| 2018/0099666 A1* | 4/2018 | Abe | B60W 40/072 |

FOREIGN PATENT DOCUMENTS

WO     2011/158347 A1     12/2011

OTHER PUBLICATIONS

PCT/ISA/210 from International application PCT/JP2016/080785 with the English translation thereof.

* cited by examiner

*Primary Examiner* — Ramsey Refai
(74) *Attorney, Agent, or Firm* — Carrier Blackman & Associates, P.C.; Joseph P. Carrier; William D. Blackman

(57) ABSTRACT

In the present invention, automated driving control of a vehicle during automated driving is fundamentally performed by referring to a medium-term trajectory which is generated in a medium period having a relatively long computation period and in which emphasis is placed on the smoothness of driving behavior changes. As an exception, in cases in which reference-excluding conditions are matched, the medium-term trajectory is ignored, and automated driving control of the vehicle is performed using only a short-term trajectory generated in a short period having a shorter computation period than the medium period. Thus, a vehicle control device is provided which ensures adaptability without diminishing responsiveness.

8 Claims, 5 Drawing Sheets

VEHICLE CONTROL DEVICE

TECHNICAL FIELD

The present invention relates to a vehicle control device suitable for being applied to a vehicle that is capable of being driven automatically (including an automated driving assist).

BACKGROUND ART

In a driving assist device disclosed in International Publication No. WO 2011/158347 (hereinafter referred to as WO2011/158347), in the case that an automated driving switch is operated by a driver, when a destination is set, a route to the destination is automatically generated by an electronic control unit, and automated driving to the destination is initiated. Further, when a destination is not set, a course to stop the vehicle, or a route following along the current travel route is automatically set by the electronic control unit, and so-called automated driving along the road is initiated.

SUMMARY OF INVENTION

Incidentally, in a vehicle capable of being driven automatically (including an automated driving assist), it is a matter of course that the vehicle is made to reach a target position by traveling on a road while satisfying conditions of adaptability and responsiveness with respect to the recognized travel environment in the immediate vicinity, and emphasis is placed on the comfortableness and riding comfort of the vehicle occupants, for example, the smoothness of changes in behavior of the vehicle, which is similar to that of an exemplary driver. However, in WO2011/158347, nothing is disclosed concerning this point, and thus room remains for improvement.

The present invention has been devised taking into consideration the aforementioned problems, and has the object of providing a vehicle control device which, while emphasis is placed on smoothness of changes in the behavior of the vehicle, is capable of ensuring or enhancing adaptability (suitability to such conditions) and responsiveness (response to inputs and stimuli) with respect to a most recently recognized travel environment.

A vehicle control device according to the present invention is a vehicle control device that controls a vehicle configured to be driven automatically, the vehicle control device comprising a first trajectory generating unit configured to generate, based on external environment recognition information in which a situation around a periphery of the vehicle is recognized, a first trajectory in a first operation cycle, and a second trajectory generating unit configured to generate, based on the external environment recognition information, and while referring to the first trajectory, a second trajectory in a second operation cycle which is shorter than the first operation cycle, wherein, when performing automated driving, in a case of a reference exclusion condition having been met, the second trajectory generating unit is configured to generate the second trajectory without referring to the first trajectory, and thereby control the vehicle.

According to the present invention, based on the external environment recognition information, in principle, the automated driving control of the vehicle is carried out with reference to the first trajectory, which is generated with a first operation cycle the operation cycle of which is relatively long, and in which smoothness of changes in the behavior of the vehicle is emphasized. As an exception thereto, based on the external environment recognition information, and under the reference exclusion condition, in the case that the reference exclusion condition is met, the automated driving control of the vehicle is carried out with only the second trajectory in which adaptability or responsiveness is ensured. For this reason, the vehicle control device is provided in which adaptability or responsiveness is ensured, while emphasis is placed on smoothness of changes in the behavior of the vehicle.

In this case, preferably, the reference exclusion condition is submitted from the first trajectory generating unit to the second trajectory generating unit.

In this manner, since the reference exclusion condition for determining that it is unnecessary to refer to the first trajectory is submitted from the relatively higher order first trajectory generating unit to the relatively lower order second trajectory generating unit, the second trajectory generating unit can generate the second trajectory in which adaptability or responsiveness is ensured, and can implement an automated driving control for the vehicle.

Moreover, by providing a configuration in which the reference exclusion condition is determined based on the external environment recognition information, it is possible to accurately determine in a timely manner whether or not it is necessary to refer to the first trajectory.

Further, the reference exclusion condition which is determined based on the external environment recognition information may occur when a travel restraint condition that restrains traveling of the host vehicle either vanishes or is alleviated, and in either case of when the travel restraint condition that restrains traveling of the host vehicle is eliminated or in the case of being alleviated, the responsiveness of the host vehicle is improved.

In this instance, vanishing or alleviation of the travel restraint condition that restrains traveling of the host vehicle occurs with any one of the following conditions, namely, when it is no longer necessary to stop at a stop line, when a collision avoidance situation vanishes after avoidance of a collision, when a target vehicle which is a target of follow-up traveling starts traveling, when a preceding vehicle accelerates, when a straight path is recognized at the conclusion of traveling along a curve, and when a curvature of a lane is alleviated. In addition, under such conditions, by not referring to the higher order first trajectory, responsiveness of the host vehicle is improved, and the flow of traffic is enhanced.

Furthermore, the reference exclusion condition, which is determined based on the external environment recognition information, may occur when a travel restraint condition that restrains traveling of the host vehicle is generated.

By not referring to the higher order medium-term trajectory when the travel restraint condition that restrains traveling of the host vehicle is generated, adaptability of the host vehicle is improved.

Generation of the travel restraint condition that restrains traveling of the host vehicle occurs with any one of the following conditions, namely, when there is a narrow road up ahead, when there is a change in slope up ahead, and when visibility is poor in a forward direction. In such a situation, by not referring to the higher order medium-term trajectory, the adaptability of the host vehicle is improved.

Further still, the reference exclusion condition is preferably a condition in which the second trajectory generating unit does not refer to the first trajectory, in a case that a deviation between the first trajectory to be referred to, and a candidate trajectory of the second trajectory to be generated is greater than or equal to a threshold value.

Stated otherwise, in the case that the deviation between the first trajectory to be referred to, and the candidate trajectory of the second trajectory to be generated is greater than or equal to the threshold value, considering that a position tracking delay, a speed tracking delay, and a turning direction tracking delay are incapable of being recovered, adaptability is improved by performing automated driving and traveling in accordance with the second trajectory.

DESCRIPTION OF EMBODIMENTS

A preferred embodiment of a vehicle control device according to the present invention will be presented and described below with reference to the accompanying drawings, in relation to a vehicle in which the vehicle control device is installed.

Configuration of Vehicle 10

Figure 1:
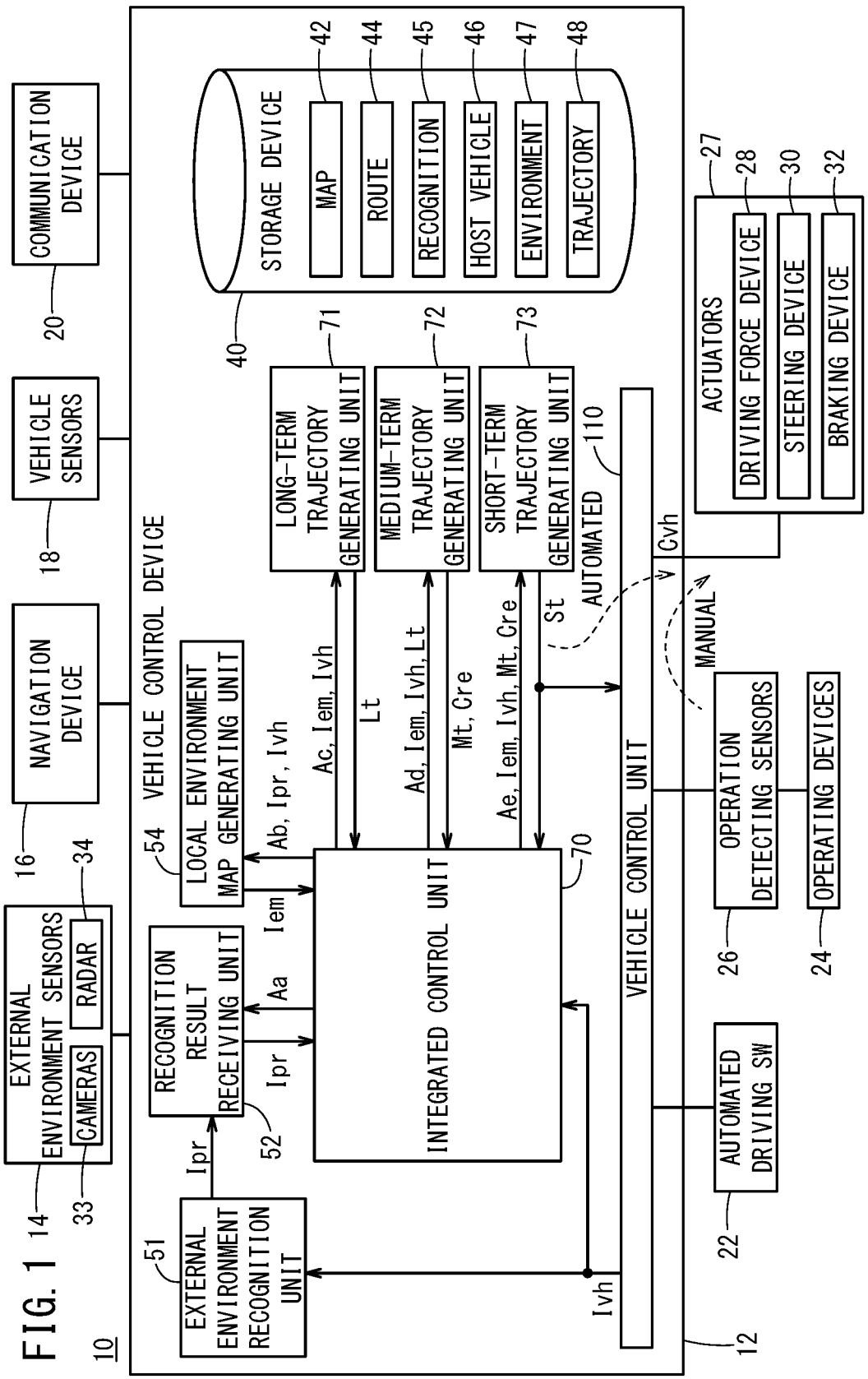
FIG. 1 is a schematic configuration block diagram of a vehicle equipped with a vehicle control device according to a present embodiment.

FIG. 1 is a schematic configuration block diagram of a vehicle 10 (also referred to as a "host vehicle" or a "driver's own vehicle") equipped with a vehicle control device 12 according to a present embodiment.

The vehicle 10 includes the vehicle control device 12, and in addition to the vehicle control device 12, is equipped with input devices and output devices which are connected via communication lines to the vehicle control device 12.

As the input devices, there are provided external environment sensors 14, a navigation device 16, vehicle sensors 18, a communication device 20, an automated driving switch (automated driving SW) 22, and operation detecting sensors 26 connected to operating devices 24.

As the output devices, there are provided actuators 27 including a driving force device 28 for driving the vehicle wheels (not shown), a steering device 30 for steering the vehicle wheels, and a braking device 32 for braking the vehicle wheels. Moreover, the navigation device 16 and the communication device 20 can also be used as input/output devices (human interface, transceiver).

Configuration of Input/Output Devices Connected to Vehicle Control Device 12

The external environment sensors 14 include a plurality of cameras 33 and a plurality of radar devices 34 which acquire information indicative of the external environment (360° around the front, rear, and sides, etc.) of the vehicle 10, and output the acquired external environmental information of the vehicle 10 to the vehicle control device 12. The external environment sensors 14 may further be equipped with a plurality of LIDAR (Light Detection and Ranging; Laser Imaging Detection and Ranging) devices.

The navigation device 16 detects and specifies a current position of the vehicle 10 using a satellite positioning device or the like, together with including a touch panel display, a speaker, and a microphone as a user interface, and further, calculates a route to a designated destination from the current position or a position designated by the user, and outputs the calculated route to the vehicle control device 12. The route calculated by the navigation device 16 is stored as route information in a route information storage unit 44 of a storage device 40.

The vehicle sensors 18 output to the vehicle control device 12 detection signals from respective sensors, including a speed (vehicle speed) sensor for detecting the speed (vehicle speed), an acceleration sensor for detecting an acceleration, a lateral G sensor for detecting a lateral G force of the vehicle 10, a yaw rate sensor for detecting an angular velocity about a vertical axis of the vehicle 10, an orientation sensor for detecting an orientation of the vehicle 10, and a gradient sensor for detecting a gradient of the vehicle 10. At each of respective operation cycles Toc, to be described later, the detection signals are stored as host vehicle state information Ivh of the host vehicle in a host vehicle state information storage unit 46 of the storage device 40.

The communication device 20 communicates with roadside devices, other vehicles, and a server, etc., and receives or transmits information related to traffic signals, etc., information related to the other vehicles, as well as probe information and updated map information or the like. In addition to being stored in the navigation device 16, the map information is stored as map information in a map information storage unit 42 of the storage device 40.

The operating devices 24 include an accelerator pedal, a steering wheel (handle), a brake pedal, a shift lever, and a direction indicating (turn signal) lever, and the like. The operation detecting sensors 26, which detect the presence or absence or the operated amounts of operations made by the driver, as well as operated positions, are attached to the operating devices 24.

The operation detecting sensors 26 output to a vehicle control unit 110 as detection results an amount by which the accelerator is depressed (degree of accelerator opening), an amount (steering amount) at which the steering wheel is operated, an amount by which the brake pedal is depressed, a shift position, and a right or left turn direction, etc.

The automated driving switch 22 (automated driving ON setting unit), for example, is a pushbutton switch provided on the instrument panel, and is operated manually by a user such as a driver or the like in order to switch between a non-automated driving mode (manual driving mode) and an automated driving mode.

The automated driving mode is a driving mode in which the vehicle 10 travels under the control of the vehicle control device 12, in a state in which the driver does not operate the operating devices 24 such as the accelerator pedal, the steering wheel, and the brake pedal, and is a driving mode in which the vehicle control device 12 controls a portion or all of the driving force device 28, the steering device 30, and the braking device 32 on the basis of action plans (a short-term trajectory St, a medium-term trajectory Mt, and a long-term trajectory Lt, to be described later).

Moreover, during the automated driving mode, in the case that the driver starts to operate any of the operating devices 24 such as the accelerator pedal, the steering wheel, or the brake pedal, the automated driving mode is canceled automatically, and the system switches over to the non-automated driving mode (manual driving mode).

In this instance, even in the manual driving mode, certain driving assist functions, such as a known adaptive cruise control (ACC) function, and a lane keeping assist system (LKAS) function can be implemented.

The driving force device 28 is constituted from a driving force ECU, and a drive source for the vehicle 10 such as an engine and/or a traction motor or the like. The driving force device 28 generates a travel driving force (torque) in order for the vehicle 10 to travel in accordance with vehicle control values Cvh input thereto from the vehicle control unit 110, and transmits the travel driving force to the vehicle wheels directly or through a transmission.

The steering device 30 is constituted from an EPS (electric power steering system) ECU, and an EPS device. The steering device 30 changes the orientation of the vehicle wheels (steered wheels) in accordance with the vehicle control values Cvh input thereto from the vehicle control unit 110.

The braking device 32, for example, is an electric servo brake used in combination with a hydraulic brake, and is made up from a brake ECU and a brake actuator.

The braking device 32 brakes the vehicle wheels in accordance with information of the vehicle control values Cvh input thereto from the vehicle control unit 110.

Moreover, steering of the vehicle 10 can also be performed by changing a torque distribution and/or a braking force distribution with respect to the left and right vehicle wheels.

Configuration of Vehicle Control Device 12

The vehicle control device 12 is constituted by one or a plurality of ECUs (electronic control units), and is equipped with the storage device 40, etc., in addition to various function realizing units. According to the present embodiment, the function realizing units are software-based functional units, in which the functions thereof are realized by a CPU (central processing unit) executing programs stored in the storage device 40. However, the functions thereof can also be realized by hardware-based functional units made up from integrated circuits or the like.

Figure 2:
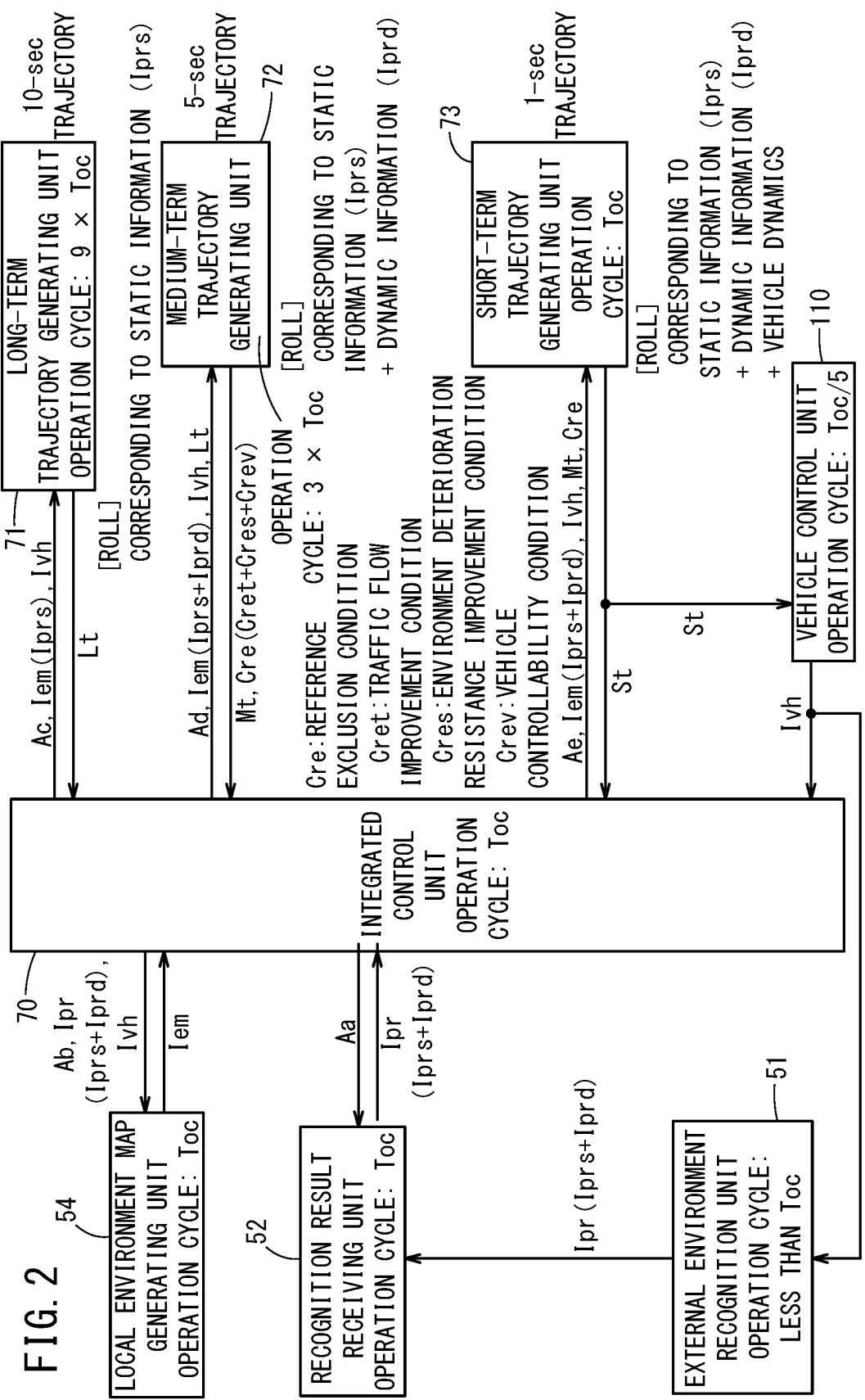
FIG. 2 is a block diagram in which the configuration of principle components appearing in FIG. 1 is extracted.

FIG. 2 is a block diagram extracted from FIG. 1 and showing the configuration of principle components of the vehicle control device 12 according to the present embodiment.

In addition to the storage device 40 (see FIG. 1) and the vehicle control unit 110 as a function realizing unit (function realizing module), the vehicle control device 12 includes an external environment recognition unit 51, a recognition result receiving unit 52, a local environment map generating unit (also referred to as an environment map generating unit) 54, a long-term trajectory generating unit 71, a medium-term trajectory generating unit 72, a short-term trajectory generating unit 73, and an integrated control unit (task synchronization module) 70 that controls these units comprehensively together with controlling task synchronization.

In the vehicle control device 12, the external environment recognition unit 51 simultaneously generates external environment recognition information Ipr made up from static (having no change or no movement) external environment recognition information Iprs, and dynamic (in which change or movement there of is possible) external environment recognition information Iprd.

When the static external environment recognition information Iprs is generated, the external environment recognition unit 51 refers to the host vehicle state information Ivh from the vehicle control unit 110, and furthermore, from among the external environment sensors 14, on the basis of the external environmental information (image information) from the cameras 33 and the like, recognizes lane markings (white lines) on both sides of the vehicle 10, together with recognizing the distances to stop lines of intersections or the like (how many meters there are up to the stop lines) as well as recognizing travel capable regions (planar regions in which guardrails and curbsides are excluded without concern to the lane markings), and then generates the static external environment recognition information Iprs, and transmits (outputs) such information to the recognition result receiving unit 52.

When the dynamic external environment recognition information Iprd is generated, the external environment recognition unit refers to the host vehicle state information Ivh, and furthermore, on the basis of the external environmental information from the cameras 33 or the like, the external environment recognition unit 51 recognizes obstacles (including parked or stopped vehicles), traffic participants (people, other vehicles), and the colors of traffic signals (blue (green), yellow (orange), red) and the like, and then generates the dynamic external environment recognition information Iprd, and transmits (outputs) such information to the recognition result receiving unit 52.

The external environment recognition unit 51 recognizes the external environment recognition information Ipr (Ipr=Iprs+Iprd) in a time period that is less than the operation cycle Toc, and transmits (outputs) the information to the recognition result receiving unit 52.

In response to an operation command Aa from the integrated control unit 70, the recognition result receiving unit 52 outputs the external environment recognition information Ipr (Ipr=Iprs+Iprd) received from the external environment recognition unit 51 to the integrated control unit 70 within the operation cycle Toc.

The integrated control unit 70 stores the external environment recognition information Ipr (Ipr=Iprs+Iprd) in the storage device 40.

In this instance, the operation cycle (also referred to as a reference cycle or a reference operation cycle) Toc is a standard operation cycle in the vehicle control device 12, and is set, for example, to a value on the order of several tens of ms.

In response to an operation command Ab from the integrated control unit 70, the local environment map generating unit 54 refers to (aggregates) the host vehicle state information Ivh as well as the external environment recognition information Ipr, and within the operation cycle Toc, generates local environment map information Iem, and outputs such information to the integrated control unit 70.

The local environment map information Iem, in general, is information obtained by synthesizing the host vehicle state information Ivh with the external environment recognition information Ipr. The local environment map information Iem is stored in a local environment map information storage unit 47 of the storage device 40.

Figure 3:
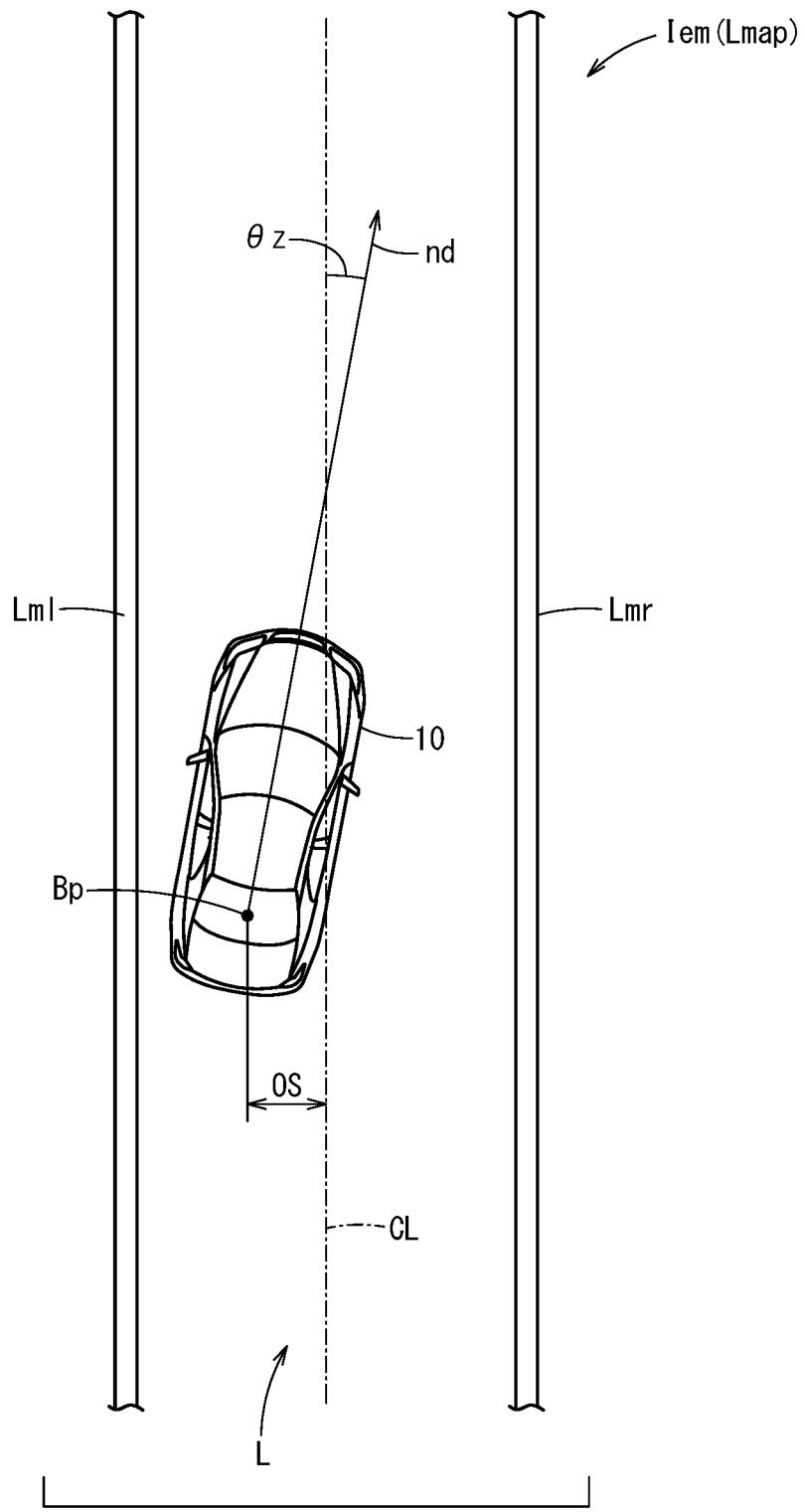
FIG. 3 is an exemplary illustration of a local environment map.

FIG. 3 shows an example of a local environment map Lmap that is stored as the local environment map information Iem.

In this instance, the host vehicle state information Ivh is information obtained from the vehicle control unit 110, and is basically made up from an offset amount (position) OS of a reference point Bp of the vehicle 10, for example, a midpoint of a rear wheel axle from a center line CL of the lane L (which is partitioned by a right side lane marking Lmr and a left side lane marking Lml), a posture angle (also referred to as an azimuth angle) θz which is an angle between the center line CL and a nose direction nd of the vehicle 10, a speed vs, an acceleration va, a curvature ρ of the travel line, a yaw rate γ, and a steering angle δst, etc. The offset amount OS may be expressed as coordinates {x (a longitudinal direction which is the direction of the travel path), y (a lateral direction which is a direction perpendicular to the travel path)} from a reference position (arbitrary).

More specifically, as shown in the following equation (1), the host vehicle state information Ivh is the most recent information at that point in time of a later-described trajectory point sequence Pj {refer to equation (2)}.

$$Ivh = Ivh(x, y, \theta z, vs, va, \rho, \gamma, \delta st) \quad (1)$$

$$Pj = Pj(x, y, \theta z, vs, va, \rho, \gamma, \delta st), t=1, 2, \ldots T \quad (2)$$

The trajectory point sequence Pj is corrected until later-described trajectory point sequence candidates Pcj(x, y, θz, vs, va, ρ, y, δst) t=1, 2, ... T are affirmatively evaluated, to result in the trajectory point sequence Pj(x, y, θz, vs, va, ρ, y, δst) t=1, 2, ... T which is an output trajectory. The term "t" corresponds to the time of an integer fraction (which may be changed depending on the speed vs) of the operation cycle Toc, with 1 being a first point, and T corresponding to the length of time of the trajectory that is generated at a point of one second or the like.

In FIG. 3, the lane L (the right lane marking Lmr and the left lane marking Lml) is the external environment recognition information Ipr that is recognized (using a known type of lane marking detection, a bird's-eye transformation, and a curve approximation process) by the external environment recognition unit 51 from the image information from the cameras 33.

In this manner, the local environment map information Iem (local environment map Lmap) becomes information indicative of the surrounding situation (a situation around the periphery of the host vehicle) of the road (lane markings Lm) with the vehicle position in the direction in which the host vehicle 10 is traveling serving as a reference, which is generated by combining the host vehicle state information Ivh and the external environment recognition information Ipr.

Returning to FIGS. 1 and 2, in response to an operation command Ac from the integrated control unit 70, the long-term trajectory generating unit 71 refers to the local environment map information Iem including the static external environment recognition information Iprs from which the dynamic external environmental information Iprd is excluded, the host vehicle state information Ivh, and a road map (curvatures of curbsides and the like) which is stored in the map information storage unit 42, generates a long-term trajectory Lt, for example, with an operation cycle of 9×Toc, and outputs the generated long-term trajectory Lt to the integrated control unit 70. The long-term trajectory Lt is stored as trajectory information It in a trajectory information storage unit 48 of the storage device 40.

More specifically, without using the dynamic external environment recognition information Iprd, the long-term trajectory generating unit 71 generates the long-term trajectory (also referred to as a 10-sec trajectory) Lt corresponding to a relatively long time period (long distance), for example, a travel time on the order of 10 seconds, which is a trajectory for the purpose of carrying out a vehicle control in which emphasis is placed on riding comfort and comfortability of the vehicle 10 (in which rapid steering and rapid acceleration/deceleration are not performed), and for example, corresponds to a trajectory that is driven by a model driver who is skilled at driving, and in which the operation cycle is of a relatively long period taking place, for example, over a long period Tl (Tl=9×Toc) on the order of several hundred ms.

In response to an operation command Ad from the integrated control unit 70, the medium-term trajectory generating unit 72 refers to the local environment map information Iem (including the dynamic external environment recognition information Iprd and the static external environment recognition information Iprs), the host vehicle state information Ivh, and the long-term trajectory Lt, generates a medium-term trajectory Mt with an operation cycle of 3× Toc, and outputs the generated medium-term trajectory Mt to the integrated control unit 70 together with a later-described reference exclusion condition Cre. The medium-term trajectory Mt is stored as trajectory information It in the trajectory information storage unit 48.

For example, in the case that the external environment recognition unit 51 has discovered an obstacle (included in the dynamic external environment recognition information Iprd) such as a parked vehicle or the like in a frontward direction of the lane L, the medium-term trajectory generating unit 72 generates the medium-term trajectory Mt (also referred to as a 5-sec trajectory) corresponding to a relatively short time period (short distance), for example, a travel time on the order of several seconds, which is a trajectory (in the case of multiple lanes on one side, a trajectory including a lane change if necessary) for bypassing the parked vehicle or the like, and in which the operation cycle is of a relatively shorter period than the long period Tl taking place, for example, over a medium period Tm (Tm=3×Toc) on the order of one hundred and several tens ms.

When the medium-term trajectory Mt is generated, in the case that the dynamic environment recognition information Iprd is not included within the local environment map information Iem, as a result, the medium-term trajectory Mt substantially coincides with the long-term trajectory Lt.

In response to an operation command Ae from the integrated control unit 70, the short-term trajectory generating unit 73 refers to the local environment map information Iem (including the dynamic external environment recognition information Iprd and the static external environment recognition information Iprs), the host vehicle state information Ivh, the medium-term trajectory Mt, and the reference exclusion condition Cre (to be described later), generates a short-term trajectory St corresponding to the vehicle dynamics of the host vehicle 10 and with the shortest operation cycle Toc from among the three trajectory generating units, and outputs the generated short-term trajectory St to the integrated control unit 70, and simultaneously outputs the same to the vehicle control unit 110.

The vehicle control unit 110 controls the actuators 27 on the basis of the short-term trajectory St. The short-term trajectory St is stored as trajectory information It in the trajectory information storage unit 48.

When the short-term trajectory St is generated, in the case that the dynamic environment recognition information Iprd is not included within the local environment map information Iem, as a result, the short-term trajectory St substantially coincides with the medium-term trajectory Mt that was generated with reference to the long-term trajectory Lt.

In this manner, the short-term trajectory generating unit 73 generates the short-term trajectory (referred to as a 1-sec trajectory) St corresponding to a relatively short time period (short distance) to be traveled henceforth, for example, a travel time on the order of one second, in which the operation cycle is of a relatively shorter period than the long period Tl and the medium period Tm, and takes place, for example, over a short period Ts (Ts=Toc) on the order of several tens of ms.

As the short-term trajectory St, for each short period Ts, there is generated a trajectory point sequence Pj(x, y, θz, vs, va, δst) as vehicle command values, generally on the basis of the position x in the longitudinal direction along the center line CL of the lane markings, the position y in the lateral direction, the posture angle θz, the speed vs, the acceleration va, and the steering angle δst (the steering angle δ of the vehicle 10 can be calculated in consideration of a gear ratio to the steering angle δst of the steering wheel), etc., {refer to the above-described equation (2)}.

In practice, before a final trajectory point sequence Pj is generated, a plurality of trajectory point sequence candidates Pcj (operation cycle: about Toc/5) are generated by the short-term trajectory generating unit 73 in each of the short periods Ts (Ts=Toc). As will be described later, concerning the generated trajectory point sequence candidates Pcj, within the same short period Ts, the trajectories are further evaluated by the short-term trajectory generating unit 73 on the basis of the vehicle dynamics, and thereafter, according to the evaluation results, corrections are made if necessary, and the trajectory point sequence Pj is generated as the output trajectory of the short-term trajectory St.

The vehicle control unit 110 converts the trajectory point sequence Pj into the vehicle control values Cvh, and outputs the values to the driving force device 28, the steering device 30, and the braking device 32, in a manner so that the vehicle 10 travels along the input short-term trajectory St, and more specifically, along the trajectory point sequence Pj that was generated and input on the order of the operation cycle Toc/5.

Moreover, the set time lengths (also referred to as time trajectories) of the short-term trajectory St, the medium-term trajectory Mt, and the long-term trajectory Lt may be changed depending on the speed vs, the steering angle δst, the curvature ρ of the travel line, the road gradient, and the like. For example, the short-term trajectory St may be changed within a range of 0.2 [s] to 2 [s], the medium-term trajectory Mt may be changed within a range of 2 [s] to 7 [s], and the long-term trajectory Lt may be changed within a range of 7 [s] to 15 [s].

Description of Operations of the Embodiment

Description According to the Flowchart

Figure 4:
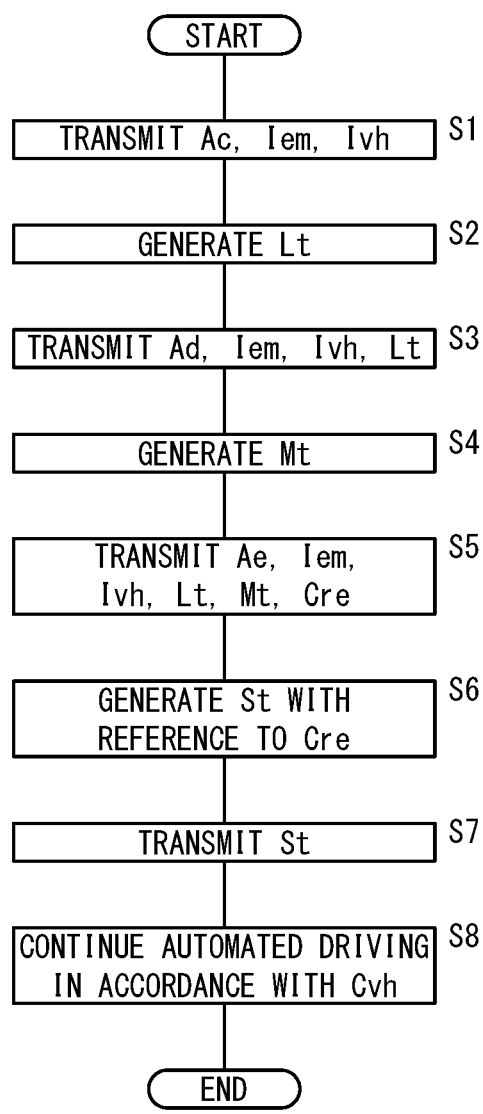
FIG. 4 is a flowchart provided to explain operations of the vehicle control device.

Operations of the vehicle control device 12, which is basically configured in the manner described above, will be described in detail with reference to the flowchart of FIG. 4.

During automated driving, in step S1, the integrated control unit 70 transmits to the long-term trajectory generating unit 71 the operation command Ac to request generation of the long-term trajectory Lt at each instance of the operation cycle 9×Toc, together with transmitting the most recent local environment map information Iem (made up from the static external environment recognition information Iprs and the host vehicle state information Ivh) generated at each operation cycle Toc by the local environment map generating unit 54, and the most recent vehicle state information Ivh generated by the vehicle control unit 110.

In step S2, as described above, the long-term trajectory generating unit 71 generates the long-term trajectory Lt made up from the trajectory point sequence Pj represented by equation (2).

Each time that the long-term trajectory Lt is generated once, in the processes of step S3 and step S4, the medium-term trajectory Mt is generated three times.

In step S3, there is transmitted from the integrated control unit 70 to the medium-term trajectory generating unit 72 the long-term trajectory Lt that was generated by the long-term trajectory generating unit 71 at each instance of the operation cycle 9×Toc, and the operation command Ad to request generation of the medium-term trajectory Mt at each instance of the operation cycle 3×Toc, together with transmitting the most recent local environment map information Iem (made up from the external environment recognition information Ipr and the host vehicle state information Ivh) generated at each operation cycle Toc by the local environment map generating unit 54, and the most recent vehicle state information Ivh generated by the vehicle control unit 110.

In step S4, on the basis of the items input thereto, the medium-term trajectory generating unit 72 generates the medium-term trajectory Mt made up from the trajectory point sequence Pj represented by equation (2). In practice, when the medium-term trajectory Mt is generated, a plurality of trajectory point sequence candidates Pcj are generated, and from the generated plurality of trajectory point sequence candidates Pcj, a trajectory point sequence candidate Pcj having a high degree of similarity with the long-term trajectory Lt is selected from among the trajectory point sequence candidates Pcj for which adaptability is satisfied (for example, obstacles such as parked vehicles are avoided), and is set as the medium-term trajectory Mt.

In the manner described above, within the external environment recognition information Ipr, although the static external environment recognition information Iprs such as the lane shape and the like is input with respect to the long-term trajectory generating unit 71 from the recognition result receiving unit 52 via the local environment map generating unit 54, the dynamic external environment recognition information Iprd such as obstacles, traffic participants, and the colors of traffic signals and the like is not input thereto.

The dynamic external environment recognition information Iprd causes a travel restraint condition to be generated that restrains traveling of the host vehicle 10.

For example, in the case that the illuminated color of a traffic signal is recognized to be yellow or red, it is necessary for the medium-term trajectory generating unit 72 to perform a deceleration control so as to stop the host vehicle 10 at the stop line.

Further, in the case it is recognized that a preceding vehicle has come to a stop (or is stopping), similarly, in order to avoid a collision, it is necessary for the medium-term trajectory generating unit 72 to perform a deceleration control to cause the vehicle to stop.

Since the medium-term trajectory generating unit 72 (and the short-term trajectory generating unit 73, as will be described later) are responsible for restraining travel on the basis of such dynamic external environment recognition information Iprd, without the long-term trajectory generating unit 71 (the long-term trajectory Lt) being involved therein, in response to a change in the dynamic external environment recognition information Iprd by which the travel restraint information vanishes or is alleviated (the illuminated color of a traffic signal has turned green, a preceding vehicle has started traveling), the medium-term trajectory generating unit 72, at each instance of the operation cycle 3×Toc, generates the medium-term trajectory Mt in which the host vehicle can initiate movement or undergo acceleration with high responsiveness.

However, since the medium-term trajectory generating unit 72 and the short-term trajectory generating unit 73 both generate respective trajectories using the dynamic external environment recognition information Iprd, even if the travel restraint information in relation to the dynamic external environment recognition information Iprd vanishes or is alleviated, the medium-term trajectory Mt is not changed by the medium-term trajectory generating unit 72 at a maximum over the time period (interval) 3×Toc [sec] which is three times the operation cycle Toc.

In a technique according to a comparative example, there is a possibility that the short-term trajectory generating unit 73 may limit adaptability and responsiveness during the period in which the medium-term trajectory Mt is not changed. More specifically, in the technique according to such a comparative example, even in the event that the short-term trajectory generating unit 73 has learned from the local environment map information Iem including the most recent dynamic external environment recognition information Iprd that the travel restraint source information has vanished or has been alleviated during the period in which adaptability and responsiveness are limited, since the medium-term trajectory Mt which is a higher order trajectory is not changed, there is a problem in that, without the lower order short-term trajectory St being changed, adaptability and responsiveness of the vehicle 10 are limited.

In order to solve this problem, according to the present embodiment, when the medium-term trajectory Mt is generated in step S4, then in step S5, the medium-term trajectory generating unit 72 submits a reference exclusion condition Cre (to be described later) for the generated medium-term trajectory Mt to the short-term trajectory generating unit 73 via the integrated control unit 70.

Moreover, each time that the medium-term trajectory Mt is generated once by the medium-term trajectory generating unit 72 in the processes of steps S3 and S4, the short-term trajectory St is generated three times by the short-term trajectory generating unit 73 in the processes of steps S5 and S6.

In step S5, there is transmitted from the integrated control unit 70 with respect to the short-term trajectory generating unit 73, at each instance of the operation cycle Toc, the operation command Ae to request generation of the short-term trajectory St, the most recent local environment map information Iem {which is made up from the external environment recognition information Ipr (the static external environment recognition information Iprs+the dynamic external environment recognition information Iprd) and the host vehicle state information Ivh} generated by the local environment map generating unit 54, and the most recent vehicle state information Ivh generated by the vehicle control unit 110, together with transmitting the long-term trajectory Lt at each instance of the operation cycle 9×Toc, and transmitting the medium-term trajectory Mt and the reference exclusion condition Cre at each instance of the operation cycle 3×Toc.

In step S6, the short-term trajectory generating unit 73 generates the short-term trajectory St made up from the trajectory point sequence Pj represented by equation (2). In practice, when the short-term trajectory St is generated, the surrounding environment is considered on the basis of the speed vs, the acceleration va, the yaw rate γ, and the steering angle δst at the current position of the host vehicle 10, a plurality of trajectory point sequence candidates Pcj for selection of the short-term trajectory St are generated from the current position (starting point) of the host vehicle 10 to a target point (end point) after 1 [sec], and from the generated plurality of trajectory point sequence candidates Pcj, a trajectory point sequence candidate Pcj having a high degree of similarity with the medium-term trajectory Mt is selected from among the trajectory point sequence candidates Pcj that satisfy a condition of adaptability (for example, to avoid traffic participants), and is set as the short-term trajectory St.

More specifically, from among the plurality of trajectory point sequence candidates Pcj, the short-term trajectory generating unit 73 evaluates the degree of similarity thereof with the trajectory point sequence Pj of the medium-term trajectory Mt, selects the trajectory point sequence candidate Pcj for which the evaluation value thereof is highest, and generates the short-term trajectory St.

The evaluation of the trajectory point sequence candidate Pcj for the short-term trajectory St, which is made with reference to the medium-term trajectory Mt, is considered to become higher as the deviation between the point sequences at the same time points is smaller, that is, as the degree of similarity therebetween is higher. However, in the event that the reference exclusion condition Cre is met, it is taken into account that adaptability with respect to collision avoidance or the like is secured, and the optimal trajectory from among the plurality of trajectory point sequence candidates Pcj is output without evaluating the degree of similarity with the medium term trajectory Mt.

To offer a more detailed explanation concerning outputting of such an optimal trajectory, the evaluation of the trajectory point sequence candidates Pcj for the short-term trajectory St is taken as a first evaluation item, the degree of similarity thereof with the medium-term trajectory Mt (under a condition in which the later-described reference exclusion condition Cre is not met) is taken as a second evaluation item, the possibility of a lane departure is taken as a third evaluation item, a degree of similarity (lateral deviation, posture angle deviation, curvature deviation) with an ideal travel path within the lane (with a straight path, for example, the ideal travel path is on a lane center line Cl; however, in the case of a curve, the ideal travel path is a so-called out-in-out travel line in which the vehicle 10 moves slightly outward while the speed vs is lowered in a straight line before entering the curve, the vehicle 10 moves slightly inward during the curve, and in proximity to the end of the curve, the vehicle 10 accelerates while moving slightly outward) is taken as a fourth evaluation item, a degree of similarity with a target travel speed is taken as a fifth evaluation time, a collision margin (distance and time) with an obstacle or the like is taken as a sixth evaluation item, and utilizing minimization of a vertical-G value and a horizontal-G value, the respective evaluation items are weighted and added, and the trajectory for which the evaluation value thereof is highest is output as the optimal trajectory.

If the reference exclusion condition Cre is met, the evaluation is excluded from the evaluation items in accordance with the degree of similarity of the aforementioned first evaluation item with the medium-term trajectory Mt, and an optimum trajectory derived from the remaining second to sixth evaluation items is output.

In this instance, a description will be given concerning the reference exclusion condition Cre for which an evaluation in accordance with the degree of similarity with the medium-term trajectory Mt is not performed.

For the reference exclusion conditions Cre, there are included, without calculating the degree of similarity, a condition (traffic flow improvement condition) Cret in which the host vehicle 10 contributes to an improvement in the flow of traffic, and a condition (environment deterioration resistance improvement condition) Cres that contributes to an improvement in the resistance of the host vehicle 10 to a deterioration in the travel environment, along with a condition (vehicle controllability condition) Crev that follows with the controllability of the host vehicle 10 that calculates the degree of similarity.

The traffic flow improvement condition Cret and the environment deterioration resistance improvement condition Cres are determined on the basis of the external environment recognition information Ipr (in this case, the dynamic external environment recognition information Iprd).

Within the reference exclusion conditions Cre that are determined on the basis of the dynamic external environment recognition information Iprd, the traffic flow improvement condition Cret is a condition that is considered when a travel restraint condition that restrains traveling of the host vehicle 10 vanishes or is alleviated, whereas, on the contrary, the environment deterioration resistance improvement condition Cres is a condition that is considered when the travel restraint condition that restrains traveling of the host vehicle 10 is generated.

In this instance, a time at which the travel restraint condition that restrains traveling of the host vehicle 10 in relation to the traffic flow improvement condition Cret vanishes or is alleviated, for example, corresponds to a time when the illuminated color of a traffic signal changes from red to green and stopping at the stop line is no longer necessary. Further, such a time also corresponds to a time at which, after the host vehicle 10 has stopped in order to avoid a collision with a preceding vehicle that has stopped, the collision avoidance situation has vanished in which the preceding vehicle has moved away from the host vehicle 10. Furthermore, such a time also corresponds to a time when a target vehicle which is a target of follow-up traveling has started traveling. Further, such a time also corresponds to a time when a preceding vehicle has accelerated. Further still, such a time also corresponds to a time when a straight path is recognized at the conclusion of traveling along a curve, or when the curvature of the lane L becomes alleviated more so than the curvature of the lane L used by the medium-term trajectory generating unit 72.

A time at which the travel restraint condition is generated, which restrains traveling of the host vehicle 10 in relation to the environment deterioration resistance improvement condition Cres, corresponds to a time at which there is a narrow road up ahead, a time when there is a change in slope up ahead, or a time when visibility is poor in a forward direction. In this case, in the short-term trajectory St, in contrast to the medium-term trajectory Mt, a trajectory is generated with a more cautious behavior (in which the speed vs or the acceleration va or the steering angle δst is smaller).

Lastly, the vehicle controllability condition Crev corresponds to a time when the degree of similarity is calculated, and a deviation between the point sequences at the same time points of the trajectory point sequence candidates Pcj of the medium-term trajectory Mt and the short-term trajectory St is greater than a threshold value. When the vehicle controllability condition Crev applies, the short-term trajectory generating unit 73 takes into account the fact that the vehicle 10 cannot track (perform a feedback control) with the respective requirements for speed, position, and turning of the medium-term trajectory Mt, and the degree of similarity with the calculated medium-term trajectory Mt is not evaluated.

In step S6, the reference exclusion conditions Cre (the traffic flow improvement condition Cret, the environmental deterioration resistance improvement condition Cres, and the vehicle controllability condition Crev) are taken into consideration, and when such conditions are met (are applicable), the short-term trajectory generating unit 73 does not refer to and ignores the long-term trajectory Lt and the medium-term trajectory Mt, and for example, from among the generated plurality of trajectory point sequence candidates Pcj, takes as an optimum trajectory the trajectory exhibiting the highest evaluation value in accordance with the above-described second through sixth evaluations exclusive of the first evaluation, and generates it as the short-term trajectory St. In this manner, by taking into consideration the reference exclusion conditions Cre, it is possible to generate short-term trajectories St for which the adaptability and responsiveness thereof with respect to the recognized environment (dynamic external environment recognition information Iprd) is high.

Next, in step S7, the short-term trajectory St generated by the short-term trajectory generating unit 73 is transmitted to the vehicle control unit 110.

In step S8, the vehicle control unit 110 converts the trajectory point sequence Pj of the short-term trajectory St into the vehicle control values Cvh, and outputs the vehicle control values Cvh to the actuators 27 (the driving force device 28, the steering device 30, and the braking device 32).

The actuators 27 (the driving force device 28, the steering device 30, and the braking device 32) are controlled on the basis of the vehicle control values Cvh, and execution of automated driving is continued.

Description in Accordance with Time Chart

Figure 5:
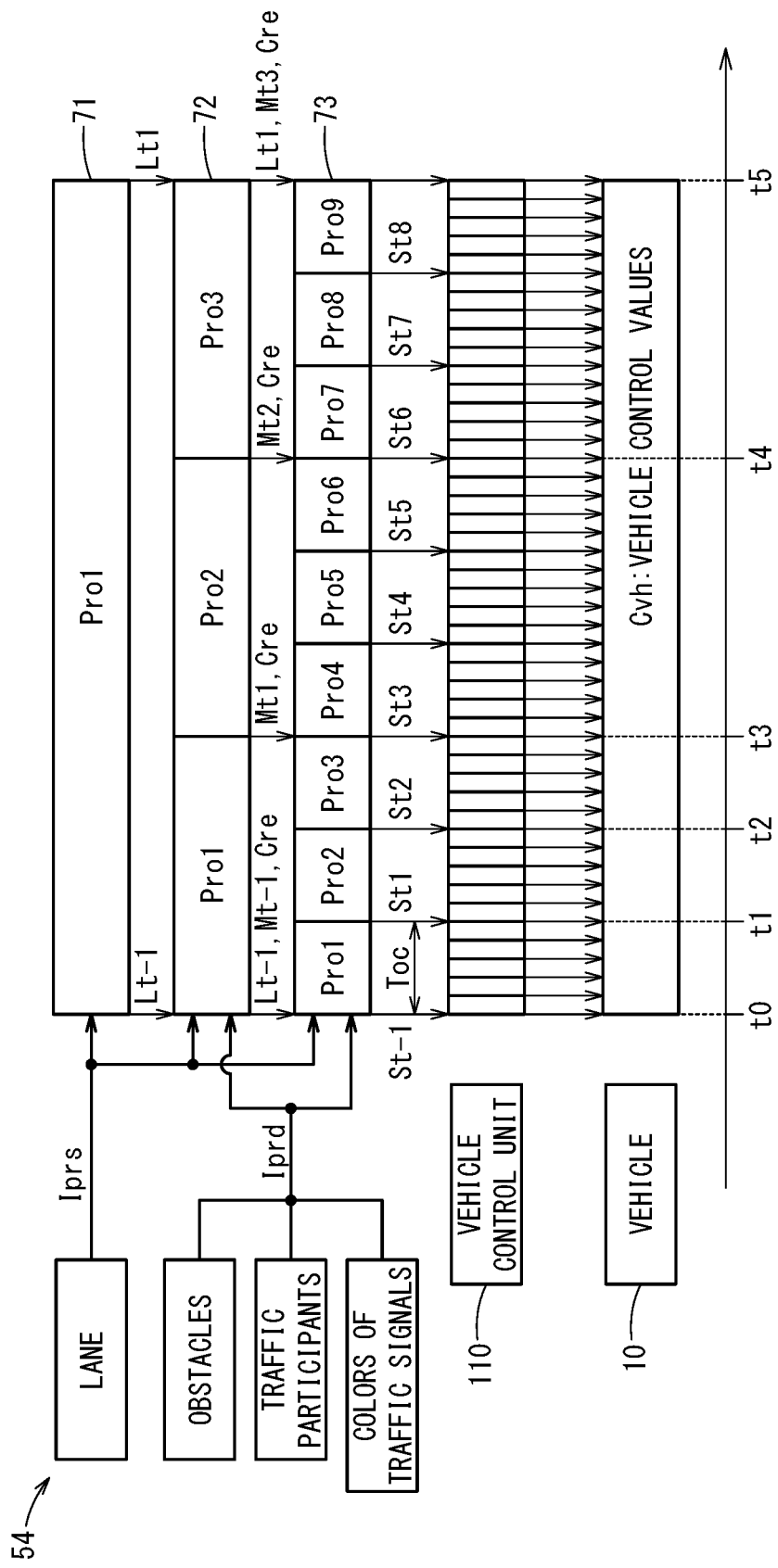
FIG. 5 is a simplified time chart provided to explain operations of the vehicle control device.

FIG. 5 is a simplified time chart showing the generation and flow of signals in the vehicle control device 12 according to the embodiment.

In FIG. 5, the static external environment recognition information Iprs such as the lane shape which serves as a portion of the local environment map information Iem is transmitted, at each instance of the operation cycle Toc, to the long-term trajectory generating unit 71, the medium-term trajectory generating unit 72, and the short-term trajectory generating unit 73 from the local environment map generating unit 54 via the integrated control unit 70. Simultaneously, the dynamic external environment recognition information Iprd such as obstacles, traffic participants, the colors of traffic signals and the like, which serves as a portion of the local environment map information Iem, is transmitted, at each instance of the operation cycle Toc, from the local environment map generating unit 54 via the integrated control unit 70 to the medium-term trajectory generating unit 72 and the short-term trajectory generating unit 73 (such information is not transmitted to the long-term trajectory generating unit 71).

In response to the operation command Ac transmitted from the integrated control unit 70 at each instance of the operation cycle 9×Toc, the long-term trajectory generating unit 71 refers to the most recent local environment map information Iem and the most recent host vehicle state information Ivh, generates the long-term trajectory Lt, and transmits the generated long-term trajectory Lt to the medium-term trajectory generating unit 72 and the short-term trajectory generating unit 73 via the integrated control unit 70.

For example, at time t0, the long-term trajectory generating unit 71 transmits to the medium-term trajectory generating unit 72 and the short-term trajectory generation unit 73 via the integrated control unit 70 the long-term trajectory Lt-1, which is generated by a process (period of 9×Toc) before its own process Pro1.

In response to the operation command Ad transmitted from the integrated control unit 70 at each instance of the operation cycle 3× Toc, the medium-term trajectory generating unit 72, in the process Pro1 of the period from time t0 to time t3, refers to the most recent local environment map information Iem, the most recent host vehicle state information Ivh, and the long-term trajectory Lt-1, generates the medium-term trajectory Mt1, and at time t3, transmits the generated medium-term trajectory Mt1 together with the reference exclusion condition Cre to the short-term trajectory generating unit 73 via the integrated control unit 70.

In response to the operation command Ae transmitted from the integrated control unit 70, at each instance of the operation cycle Toc, for example, between time t0 and time t1, the short-term trajectory generating unit 73 refers to the most recent local environment map information Iem, the most recent host vehicle state information Ivh, the medium-term trajectory Mt-1, the long-term trajectory Lt-1, and the reference exclusion condition Cre, generates the short-term trajectory St1, and at time t1, transmits the generated short-term trajectory St1 to the integrated control unit 70 together with transmitting it to the vehicle control unit 110.

Next, between time t1 and time t2, in response to the operation command Ae from the integrated control unit 70, the short-term trajectory generating unit 73 refers to the most recent local environment map information Iem, the most recent host vehicle state information Ivh, the medium-term trajectory Mt-1, the long-term trajectory Lt-1, and the reference exclusion condition Cre, generates the short-term trajectory St2 in its own process Pro2, and at time t2, transmits the generated short-term trajectory St2 to the integrated control unit 70 together with transmitting it to the vehicle control unit 110.

In the case that the content of the dynamic external environment recognition information Iprd has been changed and conforms with the reference exclusion condition Cre immediately prior to generation of the short-term trajectory St2 in the process Pro2 performed from time t1, then in the process Pro2, the long-term trajectory Lt-1 and the medium-term trajectory Mt-1 are ignored, and the short-term trajectory St2 is spontaneously generated. Therefore, with respect to the transition of the dynamic external environment recognition information Iprd, it is possible to generate a short-term trajectory St2 that is superior in terms of adaptability and responsiveness.

The vehicle control unit 110 converts the trajectory point sequence Pj into the vehicle control values Cvh, and outputs the values to the driving force device 28, the steering device 30, and the braking device 32, in a manner so that the vehicle 10 travels along the input short-term trajectory St, and more specifically, along the trajectory point sequence Pj that was generated and input on the order of the operation cycle Toc/5, and together therewith, at each instance of the operation cycle Toc, transmits the host vehicle state information Ivh to the integrated control unit 70 and the external environment recognition unit 51.

Summary

In order to facilitate understanding, the medium-term trajectory generating unit 72 and the short-term trajectory generating unit 73 will be described as targets for description.

The vehicle control device 12 according to the above-described embodiment is a vehicle control device 12 that controls a vehicle 10 configured to be driven automatically, the vehicle control device 12 being equipped with the medium-term trajectory generating unit 72 as a first trajectory generating unit configured to generate, based on the external environment recognition information Ipr in which a situation around the periphery of the vehicle 10 is recognized, the medium-term trajectory Mt as a first trajectory in the medium period Tm (Tm=3×Toc) as a first operation cycle, and the short-term trajectory generating unit 73 as a second trajectory generating unit which generates, while referring to the medium-term trajectory Mt, the short-term trajectory St as a second trajectory in the short period Ts (Ts=Toc) as a second operation cycle that is shorter than the medium period Tm.

When performing automated driving, under the reference exclusion condition Cre, in the case that the reference exclusion condition Cre is met, the short-term trajectory generating unit 73 is configured to generate the short-term trajectory St without referring to and while ignoring the medium-term trajectory Mt, and thereby control the vehicle 10.

According to the present embodiment, in principle, the automated driving control of the vehicle 10 is carried out with reference to the medium-term trajectory Mt, which is generated with the medium period Tm the operation cycle of which is relatively long, and in which smoothness of changes in the behavior of the vehicle is emphasized. As an exception thereto, under the reference exclusion condition Cre, in the case that the reference exclusion condition Cre is met, the automated driving control of the vehicle 10 is carried out with only the short-term trajectory St. For this reason, the vehicle control device 12 is provided in which adaptability or responsiveness with respect to the most recent travel environment recognized with the local environment map information Iem is ensured, and while emphasis is placed on smoothness of changes in the behavior of the vehicle.

In this case, since the reference exclusion condition Cre for determining that it is unnecessary to refer to the medium-term trajectory Mt is submitted from the higher order medium-term trajectory generating unit 72 to the lower order short-term trajectory generating unit 73, the short-term trajectory generating unit 73 can generate the short-term trajectory St in which adaptability or responsiveness is ensured, and can implement the automated driving control for the vehicle 10.

Moreover, from the fact that the reference exclusion condition Cre is determined based on the dynamic external environment recognition information Iprd, it is possible to accurately determine in a timely manner whether or not it is necessary to refer to the medium-term trajectory Mt.

In the reference exclusion conditions Cre that are determined based on the dynamic external environment recognition information Iprd, more specifically, there are included the traffic flow improvement condition Cret and the environment deterioration resistance improvement condition Cres, and such conditions are met when the travel restraint condition that restrains traveling of the host vehicle 10 either vanishes or is alleviated.

In this instance, when the traffic flow improvement condition Cret is selected, the time at which the travel restraint condition that restrains traveling of the host vehicle 10 vanishes or is alleviated, for example, corresponds to a time when the illuminated color of a traffic signal has undergone a transition from red to green, and thus stopping at the stop line is no longer necessary. Further, such a time also corresponds to a time when, after the vehicle has stopped in order to avoid a collision, the collision avoidance situation has vanished. Furthermore, such a time also corresponds to a time when a target vehicle which is a target of follow-up traveling has started traveling. Further still, such a time also corresponds to a time when a preceding vehicle has accelerated. Further still, such a time also corresponds to a time when a straight path is recognized at the conclusion of traveling along a curve, or when the curvature of the lane L has become alleviated. Under such circumstances, by not referring to the higher order medium-term trajectory Mt, the responsiveness of the host vehicle 10 is improved and the flow of traffic is enhanced.

When the environment deterioration resistance improvement condition Cres is selected, the travel restraint condition that restrains traveling of the host vehicle 10 corresponds to any one of a time when there is a narrow road up ahead in front of the host vehicle 10, a time when there is a change in slope up ahead, or a time when visibility is poor in a forward direction, and by not referring to the medium-term trajectory Mt at such a time, the adaptability of the host vehicle 10 is improved.

Furthermore, in the reference exclusion conditions Cre, there is included the vehicle controllability condition Crev. Stated otherwise, in the case that a deviation between the medium-term trajectory Mt to be referred to by the short-term trajectory generating unit 73, and a candidate trajectory for the short-term trajectory St to be generated is greater than or equal to a threshold value, considering that a position tracking delay, a speed tracking delay, and a turning direction tracking delay are incapable of being recovered, adaptability is improved by traveling in accordance with the short-term trajectory St.

The present invention is not limited to the embodiment described above, and it goes without saying that various configurations could be adopted therein based on the descriptive content of the present specification.

The invention claimed is:

1. A vehicle control device that controls a vehicle configured to be driven automatically, the vehicle control device comprising:
   a first trajectory generating unit configured to generate, based on external environment recognition information in which a situation around a periphery of the vehicle is recognized, a first trajectory in a first operation cycle; and
   a second trajectory generating unit configured to generate, based on the external environment recognition information, and while referring to the first trajectory, a second trajectory in a second operation cycle which is shorter than the first operation cycle;
   wherein, when performing automated driving, in a case of a reference exclusion condition having been met, the second trajectory generating unit is configured to generate the second trajectory without referring to the first trajectory, and thereby control the vehicle.

2. The vehicle control device according to claim 1, wherein the reference exclusion condition is submitted from the first trajectory generating unit to the second trajectory generating unit.

3. The vehicle control device according to claim 1, wherein the reference exclusion condition is determined based on the external environment recognition information.

4. The vehicle control device according to claim 3, wherein the reference exclusion condition which is determined based on the external environment recognition information occurs when a travel restraint condition that restrains traveling of the host vehicle either vanishes or is alleviated.

5. The vehicle control device according to claim 4, wherein vanishing or alleviation of the travel restraint condition that restrains traveling of the host vehicle occurs with any one of the following conditions:
   when it is no longer necessary to stop at a stop line;
   when a collision avoidance situation vanishes after avoidance of a collision;
   when a target vehicle which is a target of follow-up traveling starts traveling;
   when a preceding vehicle accelerates;
   when a straight path is recognized at the conclusion of traveling along a curve; and
   when a curvature of a lane is alleviated.

6. The vehicle control device according to claim 3, wherein the reference exclusion condition which is determined based on the external environment recognition information occurs when a travel restraint condition that restrains traveling of the host vehicle is generated.

7. The vehicle control device according to claim 6, wherein generation of the travel restraint condition that restrains traveling of the host vehicle occurs with any one of the following conditions:
   when there is a narrow road up ahead;
   when there is a change in slope up ahead; and
   when visibility is poor in a forward direction.

8. The vehicle control device according to claim 1, wherein the reference exclusion condition is a condition in which the second trajectory generating unit does not refer to the first trajectory, in a case that a deviation between the first trajectory to be referred to, and a candidate trajectory of the second trajectory to be generated is greater than or equal to a threshold value.

\* \* \* \* \*